(12) United States Patent
Chang et al.

(10) Patent No.: US 12,313,848 B2
(45) Date of Patent: May 27, 2025

(54) REFLECTIVE EXIT PUPIL REPLICATOR FOR HUD SYSTEM

(71) Applicant: GM Global Technology Operations LLC, Detroit, MI (US)

(72) Inventors: Kai-Han Chang, Sterling Heights, MI (US); Manoj Sharma, Troy, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 535 days.

(21) Appl. No.: 17/814,652

(22) Filed: Jul. 25, 2022

(65) Prior Publication Data
US 2024/0027756 A1 Jan. 25, 2024

(51) Int. Cl.
*G02B 27/01* (2006.01)
*B60K 35/00* (2006.01)
*G02B 17/00* (2006.01)
*G02B 17/04* (2006.01)
*G02B 27/14* (2006.01)
*B60K 35/23* (2024.01)

(52) U.S. Cl.
CPC .......... *G02B 27/0101* (2013.01); *B60K 35/00* (2013.01); *G02B 17/002* (2013.01); *G02B 17/04* (2013.01); *G02B 27/14* (2013.01); *B60K 35/23* (2024.01); *B60K 2360/23* (2024.01); *B60K 2360/29* (2024.01)

(58) Field of Classification Search
CPC .. G02B 27/0101; G02B 17/002; G02B 17/04; G02B 27/14; G02B 27/0081; B60K 35/00; B60K 35/23; B60K 2360/23; B60K 2360/29; B60K 2360/785; B60K 35/232
See application file for complete search history.

(56) References Cited

U.S. PATENT DOCUMENTS

2016/0377865 A1* 12/2016 Alexander ......... G02B 27/0081 345/8
2023/0393392 A1* 12/2023 Minami ................. B60K 35/23

* cited by examiner

*Primary Examiner* — James C. Jones
(74) *Attorney, Agent, or Firm* — Vivacqua Crane, PLLC (57) ABSTRACT

A head-up display system includes a projector adapted to project an image, a primary reflector, and an exit pupil replicator, the primary reflector adapted to reflect an image projected by the projector to the exit pupil replicator, and the exit pupil replicator adapted to split the projected image into a two-dimensional array of identical projected images having equal intensity.

20 Claims, 4 Drawing Sheets

REFLECTIVE EXIT PUPIL REPLICATOR FOR HUD SYSTEM

INTRODUCTION

The present disclosure relates to a head-up display system for a driver of a vehicle, such as an automobile. A head-up display (HUD) has become common in modern automobiles. HUDs project useful information like speed and navigation information into the driver's field of view. This avoids forcing the driver to look down, away from the road, to read gages on the dash of the automobile. This reduces driver distractions and keeps the driver's eyes on the road.

New HUD systems may include projecting augmented reality images, such as optimal travel paths or navigation arrows to provide images that appear to be on the actual road surface. Unfortunately, HUD systems with such capability are set up to provide accurate placement for the "nominal driver". To ensure that a driver sees such projected images at the proper location on the road surface, the position of the projected image must be adjusted to accommodate for varying heights of the vehicle and varying vertical location of the driver's eyes relative to the HUD system.

To increase the range of drivers that will be able to see the images of the HUD, often such systems use an exit pupil expander/replicator or waveguide to extend the eye-box. The image is projected into the exit pupil replicator and then propagates inside the exit pupil replicator and is extracted multiple times. The re-circulation of the light several times within the exit pupil replicator expands the pupil so the viewer can see the image from an extended eye-box. In addition to expanding the eye-box, the exit pupil replicator also magnifies the original projected image coming out of the projector.

Traditional exit pupil replicators are the most significant contributor to overall size and mass of HUD systems. Thus, while current HUD systems and methods achieve their intended purpose, there is a need for a new and improved head-up display system incorporating an exit pupil replicator that reduces the overall size and mass of the head-up display system.

SUMMARY

According to several aspects of the present disclosure, a head-up display system includes a projector adapted to project an image, a primary reflector, and an exit pupil replicator, the primary reflector adapted to reflect an image projected by the projector to the exit pupil replicator, and the exit pupil replicator adapted to split the projected image into a two-dimensional array of identical projected images having equal intensity.

According to another aspect, the exit pupil replicator includes a plurality of lateral reflective surfaces and a plurality of vertical reflective surfaces, the plurality of lateral reflective surfaces adapted to split the projected image reflected from the primary reflector into a one-dimensional array of identical projected images having equal intensity and to reflect the one-dimensional array of identical projected images having equal intensity to the plurality of vertical reflective surfaces.

According to another aspect, the projected image is projected from the projector to the primary reflector, reflected from the primary reflector to the plurality of lateral reflective surfaces of the exit pupil replicator, and reflected from the plurality of lateral reflective surfaces of the exit pupil replicator to the plurality of vertical reflective surfaces of the exit pupil replicator within a single plane.

According to another aspect, the projected image is projected from the projector to the primary reflector and reflected from the primary reflector to the plurality of lateral reflective surfaces of the exit pupil replicator within a first plane, and the projected image is reflected from the plurality of lateral reflective surfaces of the exit pupil replicator to the plurality of vertical reflective surfaces of the exit pupil replicator in a second plane.

According to another aspect, the plurality of vertical reflective surfaces are adapted to split the one-dimensional array of identical projected images having equal intensity reflected from the plurality of lateral reflective surfaces into the two-dimensional array of identical projected images having equal intensity and to reflect the two-dimensional array of identical projected images having equal intensity upward to a windshield.

According to another aspect, each of the plurality of lateral reflective surfaces and each of the plurality of vertical reflective surfaces is a compound prism.

According to another aspect, each prism includes a first piece and a second piece, a refractive index of the second piece being higher than a refractive index of the first piece, wherein a portion of an image incident upon the prism is reflected from an outer surface of the first piece, and a portion of the image incident upon the prism passes through the first piece and the second piece and leaves the second piece parallel to a path of the image incident upon the prism.

According to another aspect, each of the plurality of lateral reflective surfaces and each of the plurality of vertical reflective surfaces is a flat beam splitter.

According to another aspect, each of the plurality of lateral reflective surfaces and each of the plurality of vertical reflective surfaces is one of a prism and a flat beam splitter.

According to another aspect, the plurality of lateral reflective surfaces are positioned in series and have varying reflectivity, each of the plurality of lateral reflective surfaces adapted to reflect a portion of an image reflected from the primary reflector to the plurality of vertical reflective surfaces and to transmit a portion of the image reflected from the primary reflector to an adjacent one of the plurality of lateral reflective surfaces, a last one of the plurality of lateral reflective surfaces adapted to reflect 100% of the image reflected from the primary reflector to the plurality of vertical reflective surfaces.

According to another aspect, the plurality of vertical reflective surfaces are positioned in series and have varying reflectivity, each of the plurality of vertical reflective surfaces adapted to reflect a portion of an image reflected from each of the plurality of lateral reflective surfaces upward to the windshield and to transmit a portion of the image reflected from each of the plurality of lateral reflective surfaces to an adjacent one of the plurality of vertical reflective surfaces, a last one of the plurality of vertical reflective surfaces adapted to reflect 100% of the image reflected from each of the plurality of lateral reflective surfaces upward to the windshield.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 1:
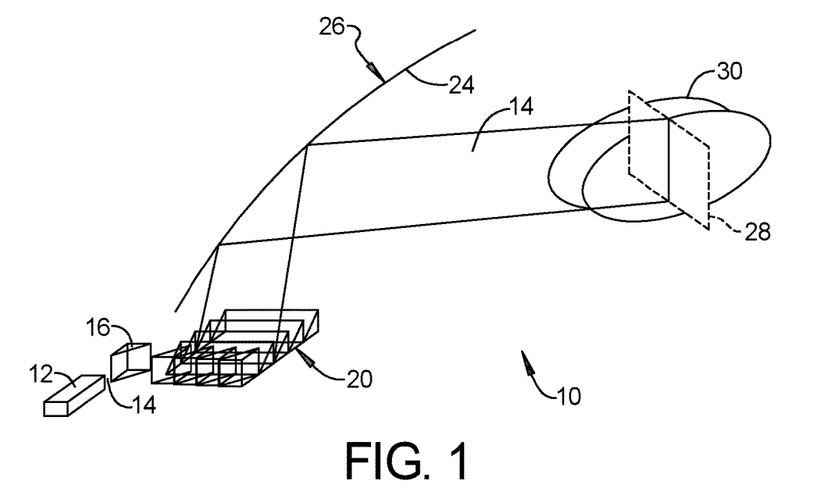
FIG. 1 is a perspective view of a head-up display system according to an exemplary embodiment.
Figure 2:
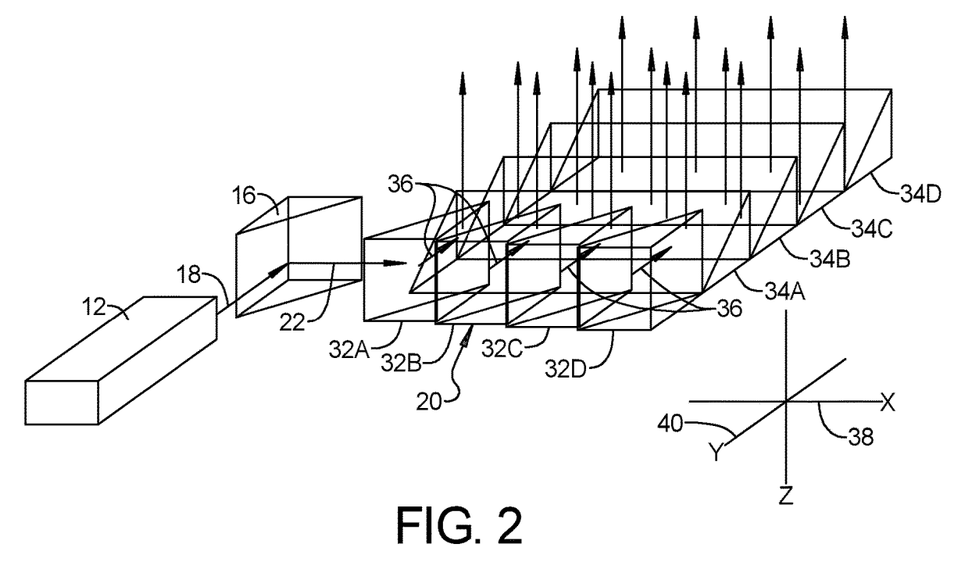
FIG. 2 is a perspective schematic view of an exit pupil replicator according to an exemplary embodiment, wherein each one of a plurality of lateral reflective surfaces and each one of a plurality of vertical reflective surfaces comprise a compound prism.

Referring to FIG. 1 and FIG. 2, a head-up display (HUD) system 10 according to the present disclosure includes a projector 12 that is adapted to project an image 14. In an exemplary embodiment, the projector 12 may be a hologram projector 12 that includes a red laser, a green laser, a blue laser and corresponding spatial light modulators for each laser. Each of the red, green and blue lasers project through the associated spatial light modulators and are collimated into a holographic image 14 that is projected outward.

A primary reflector 16 is positioned in proximity to the projector 12 and is adapted to reflect the image 14 projected by the projector 12, as indicated by arrow 18, to an exit pupil replicator 20, as indicated by arrow 22. In an exemplary embodiment, the primary reflector 16 may be a beam steering device. A beam steering device is adapted to adjust a look down angle (LDA) of the image 14 projected by the projector 12. In optical systems, beam steering may be accomplished by changing the refractive index of the medium through which the beam is transmitted or by the use of mirrors, prisms, lenses, or rotating diffraction gratings. Examples of optical beam steering approaches include mechanical mirror-based gimbals or beam-director units, galvanometer mechanisms that rotate mirrors, Risley prisms, phased-array optics, and microelectromechanical systems (MEMS) using micro-mirrors.

The exit pupil replicator 20 is adapted to split the projected image 14 into a two-dimensional array of identical projected images 14' having equal intensity. The array of identical projected images 14' is directed upward to an inner surface 24 of a windshield 26, and reflects from the inner surface 24 of the windshield 26 to an eye-box 28. The eye-box 22 is the three-dimensional region within which a driver of the automobile can see the entire projected image from the HUD system. An eyellipse 30 is a three-dimensional graphical depiction of a multivariate normal distribution used to approximate the distribution of driver eye locations within the automobile. The eyellipse 30 is represented by two three-dimensional ellipses, one for the right eye and one for the left eye.

By splitting the projected image 14 into a two-dimensional array 14' of identical projected images having equal intensity, the exit pupil replicator 20 creates a plurality of co-planer sub-eye-boxes, one for each of the identical projected images, which enlarges the effective eye-box 28 within which a driver will be able to see the HUD image.

The exit pupil replicator 20 includes a plurality of lateral reflective surfaces 32A, 32B, 32C, 32D and a plurality of vertical reflective surfaces 34A, 34B, 34C, 34D. As shown, the exit pupil replicator 20 includes four lateral reflective surfaces 32A, 32B, 32C, 32D and four vertical reflective surfaces 34A, 34B, 34C, 34D. It should be understood that the novel features of the present disclosure are applicable to an exit pupil replicator 20 having any number of appropriate lateral reflective surfaces 32A, 32B, 32C, 32D and vertical reflective surfaces 34A, 34B, 34C, 34D. The plurality of lateral reflective surfaces 32A, 32B, 32C, 32D are adapted to split the projected image 14 reflected from the primary reflector 16 into a one-dimensional array of identical projected images having equal intensity. Referring to FIG. 2, as shown, the four lateral reflective surfaces 32A, 32B, 32C, 32D split the image reflected by the primary reflector into a 1×4 array of identical projected images having equal intensity and reflect the one-dimensional array of identical projected images having equal intensity to the plurality of vertical reflective surfaces, as shown by arrows 36.

Referring to FIG. 2, in one exemplary embodiment, the projector 12, the primary reflector 16 and the exit pupil replicator 20 are positioned such that the projected image 14 is projected from the projector 12 to the primary reflector 16, as shown by arrow 18, reflected from the primary reflector 16 to the plurality of lateral reflective surfaces 32A, 32B, 32C, 32D of the exit pupil replicator 20, as shown by arrow 22, and reflected from the plurality of lateral reflective surfaces 32A, 32B, 32C, 32D of the exit pupil replicator 20 to the plurality of vertical reflective surfaces 34A, 34B, 34C, 34D of the exit pupil replicator 20, as indicated by arrows 36, within a single plane. As shown, the projected image 14 is projected from the projector 12 to the primary reflector 16, reflected from the primary reflector 16 to the plurality of lateral reflective surfaces 32A, 32B, 32C, 32D of the exit pupil replicator 20, and reflected from the plurality of lateral reflective surfaces 32A, 32B, 32C, 32D of the exit pupil replicator 20 to the plurality of vertical reflective surfaces 34A, 34B, 34C, 34D of the exit pupil replicator 20 within a plane defined by the x-axis 38 and the y-axis 40.

Figure 3:
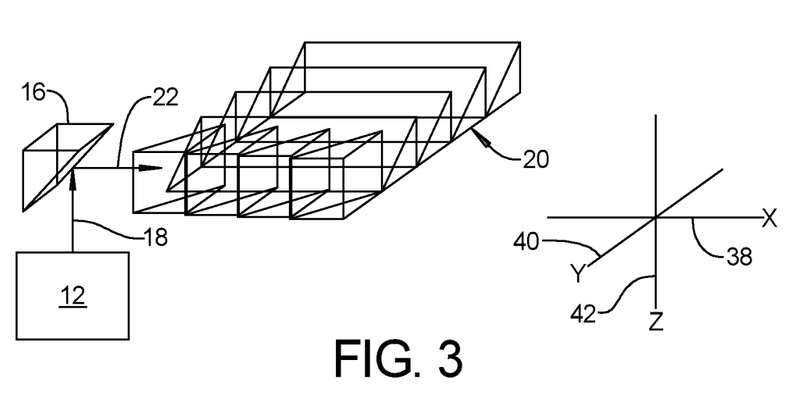
FIG. 3 is a perspective schematic view of an exit pupil replicator according to an exemplary embodiment, wherein a projector and a primary reflector lie within a first plane, and plurality of lateral reflective surfaces and the plurality of vertical reflective surfaces lie within a second plane.

Referring to FIG. 3, in another exemplary embodiment, the projector 12, the primary reflector 16 and the exit pupil replicator 20 are positioned such that the projected image 14 is projected from the projector 12 to the primary reflector 16 and reflected from the primary reflector 16 to the plurality of lateral reflective surfaces 32A, 32B, 32C, 32D of the exit pupil replicator 20 within a first plane that is defined by the x-axis 38 and a z-axis 42. The projected image 14 is reflected from the plurality of lateral reflective surfaces 32A, 32B, 32C, 32D of the exit pupil replicator 20 to the plurality of vertical reflective surfaces 34A, 34B, 34C, 34D of the exit pupil replicator 20 in a second plane that is defined by the x-axis 38 and the y-axis 40.

Figure 4:
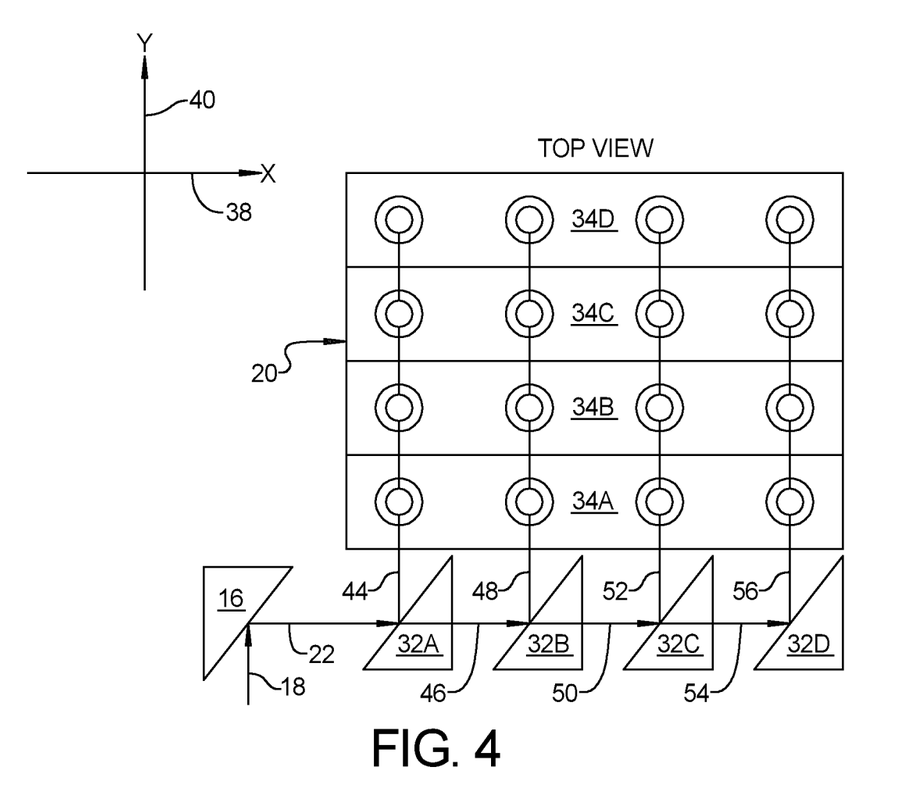
FIG. 4 is a top view of the exit pupil replicator shown in FIG. 2.

Referring to FIG. 4, a top view of the exit pupil replicator 20 illustrates how the plurality of lateral reflective surfaces 32A, 32B, 32C, 32D split and reflect the image to the plurality of vertical reflective surfaces 34A, 34B, 34C, 34D. The plurality of lateral reflective surfaces 32A, 32B, 32C, 32D are positioned in series and have varying reflectivity. Each of the plurality of lateral reflective surfaces 32A, 32B, 32C, 32D is adapted to reflect a portion of an image reflected from the primary reflector 16 to the plurality of vertical reflective surfaces 34A, 34B, 34C, 34D and to transmit a portion of the image reflected from the primary reflector 16 to an adjacent one of the plurality of lateral reflective surfaces 32A, 32B, 32C, 32D. As shown, the plurality of lateral reflective surfaces 32A, 32B, 32C, 32D includes a first lateral reflective surface 32A, a second lateral reflective surface 32B, a third lateral reflective surface 32C and a fourth lateral reflective surface 32D.

Each of the first, second, third and fourth lateral reflective surfaces 32A, 32B, 32C, 32D has varying level of reflectivity. As the projected image hits the first lateral reflective surface 32A, a portion of the projected image is reflected to the plurality of vertical reflective surfaces 34A, 34B, 34C, 34D, as shown by arrow 44, and a portion of the projected image passes through the first lateral reflective surface 32A toward the adjacent second lateral reflective surface 32B, as indicated by arrow 46. As the projected image hits the second lateral reflective surface 32B, a portion of the projected image is reflected to the plurality of vertical reflective surfaces 34A, 34B, 34C, 34D, as shown by arrow 48, and a portion of the projected image passes through the second lateral reflective surface 32B toward the adjacent third reflective surface 32C, as indicated by arrow 50. As the projected image hits the third lateral reflective surface, a portion of the projected image is reflected to the plurality of vertical reflective surfaces 34A, 34B, 34C, 34D, as shown by arrow 52, and a portion of the projected image passes through the third lateral reflective surface 32C toward the adjacent fourth lateral reflective surface 32D, as indicated by arrow 54. The fourth lateral reflective surface 32D is the last one of the series of the plurality of lateral reflective surfaces 32A, 32B, 32C, 32D. The reflectivity of the fourth lateral reflective surface 32D is 100%, thus reflecting the image to the plurality of vertical reflective surfaces 34A, 34B, 34C, 34D, as indicated by arrow 56.

The image reflected to the plurality of vertical reflective surfaces 34A, 34B, 34C, 34D by each of the first, second, third and fourth lateral reflective surfaces 32A, 32B, 32C, 32D must have the same intensity, thus, the reflectivity of the first lateral reflective surface 32A is less than the reflectivity of the second lateral reflective surface 32B, which is less than the reflectivity of the third lateral reflective surface 32C, which is less than the reflectivity of the fourth lateral reflective surface 32D. The fourth lateral reflective surface 32D is the last in the series and has a reflectivity of 100%. To ensure that the image reflected to the plurality of vertical reflective surfaces 34A, 34B, 34C, 34D by each of the plurality of lateral reflective surfaces 32A, 32B, 32C, 32D has the same intensity, the reflectivity, R, of the $i^{th}$ lateral reflective surface for an exit pupil replicator 20 having m lateral reflective surfaces is given by:

$$R_{i^{th}} = \frac{\frac{1}{m}}{1 - \frac{i-1}{m}} \times 100\%.$$

The surface reflectance of the plurality of lateral reflective surfaces 32A, 32B, 32C, 32D may be controlled using known techniques, such as, by way of non-limiting examples, using designed dielectric layer for each region to achieve certain reflectivity, sputter different densities of silver nanowires or metallic nanoparticles, or designed refractive index mismatched interface (photopolymer with controlled polymerization to create certain refractive index).

Figure 5:
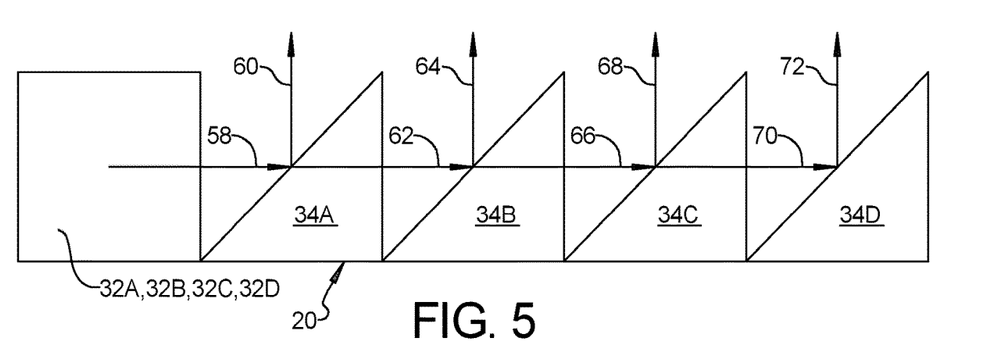
FIG. 5 is a side view of the exit pupil replicator shown in FIG. 2.

Referring to FIG. 5, a side view of the exit pupil replicator 20 illustrates how the plurality of vertical reflective surfaces 34A, 34B, 34C, 34D split and reflect the image upward to the windshield 26. The plurality of vertical reflective surfaces 34A, 34B, 34C, 34D are positioned in series and have varying reflectivity. Each of the plurality of vertical reflective surfaces 34A, 34B, 34C, 34D is adapted to reflect a portion of the image reflected from each of the plurality of lateral reflective surfaces 32A, 32B, 32C, 32D upward to the windshield 26 and to transmit a portion of the image reflected from each of the plurality of lateral reflective surfaces 32A, 32B, 32C, 32D to an adjacent one of the plurality of vertical reflective surfaces 34A, 34B, 34C, 34D. As shown, the plurality of vertical reflective surfaces 34A, 34B, 34C, 34D includes a first vertical reflective surface 34A, a second vertical reflective surface 34B, a third vertical reflective surface 34C and a fourth vertical reflective surface 34D. Thus, the plurality of vertical reflective surfaces 34A, 34B, 34C, 34D is adapted to split each of the four identical images within the 1×4 array of images reflected by the four lateral reflective surfaces 32A, 32B, 32C, 32D, and split the image from each of the four lateral reflective surfaces 32A, 32B, 32C, 32D into 4 identical images, thus creating a two-dimensional 4×4 array of identical images having equal intensity that is reflected upward to the inner surface 24 of the windshield 26.

Each of the first, second, third and fourth vertical reflective surfaces 34A, 34B, 34C, 34D has varying level of reflectivity. As projected images from each of the first, second, third and fourth lateral reflective surfaces 32A, 32B, 32C, 32D hit the first vertical reflective surface 34A, as indicated by arrow 58, a portion of each of the images from each of the first, second, third and fourth lateral reflective surfaces 32A, 32B, 32C, 32D are reflected upward to the windshield 26, as shown by arrow 60, and a portion of each of the images from each of the first, second, third and fourth lateral reflective surfaces 32A, 32B, 32C, 32D passes through the first vertical reflective surface 34A toward the adjacent second vertical reflective surface 34B, as indicated by arrow 62. As the images from each of the first, second, third and fourth lateral reflective surfaces 32A, 32B, 32C, 32D hit the second vertical reflective surface 34B, a portion of each of the images from each of the first, second, third and fourth lateral reflective surfaces 32A, 32B, 32C, 32D is reflected upward to the windshield 26, as shown by arrow 64, and a portion of each of the images from each of the first, second, third and fourth lateral reflective surfaces 32A, 32B, 32C, 32D passes through the second vertical reflective surface 34B toward the adjacent third vertical reflective surface 34C, as indicated by arrow 66. As each of the images from each of the first, second, third and fourth lateral reflective surfaces 32A, 32B, 32C, 32D hits the third vertical reflective surface 34C, a portion of each of the images from each of the first, second, third and fourth lateral reflective surfaces 32A, 32B, 32C, 32D is reflected upward to the windshield 26, as shown by arrow 68, and a portion of each of the images from each of the first, second, third and fourth lateral reflective surfaces 32A, 32B, 32C, 32D passes through the third vertical reflective surface 34C toward the adjacent fourth vertical reflective surface 34D, as indicated by arrow 70. The fourth vertical reflective surface 34D is the last one of the series of the plurality of vertical reflective surfaces 34A, 34B, 34C, 34D. The reflectivity of the fourth lateral reflective surface 32D is 100%, thus reflecting the image upward to the windshield 26, as indicated by arrow 72.

The images reflected upward to the windshield 26 by each of the first, second, third and fourth vertical reflective surfaces 34A, 34B, 34C, 34D must have the same intensity, thus, the reflectivity of the first vertical reflective surface 34A is less than the reflectivity of the second vertical reflective surface 34B, which is less than the reflectivity of the third vertical reflective surface 34C, which is less than the reflectivity of the fourth vertical reflective surface 34D. The fourth vertical reflective surface 34D is the last in the series and has a reflectivity of 100%. To ensure that the image reflected upward to the windshield by each of the plurality vertical reflective surfaces 34A, 34B, 34C, 34D has the same intensity, the reflectivity, R, of the $i^{th}$ vertical reflective surface for an exit pupil replicator 20 having n lateral reflective surfaces is given by:

$$R_{i,th} = \frac{\frac{1}{n}}{1 - \frac{i-1}{n}} \times 100\%.$$

Figure 8:
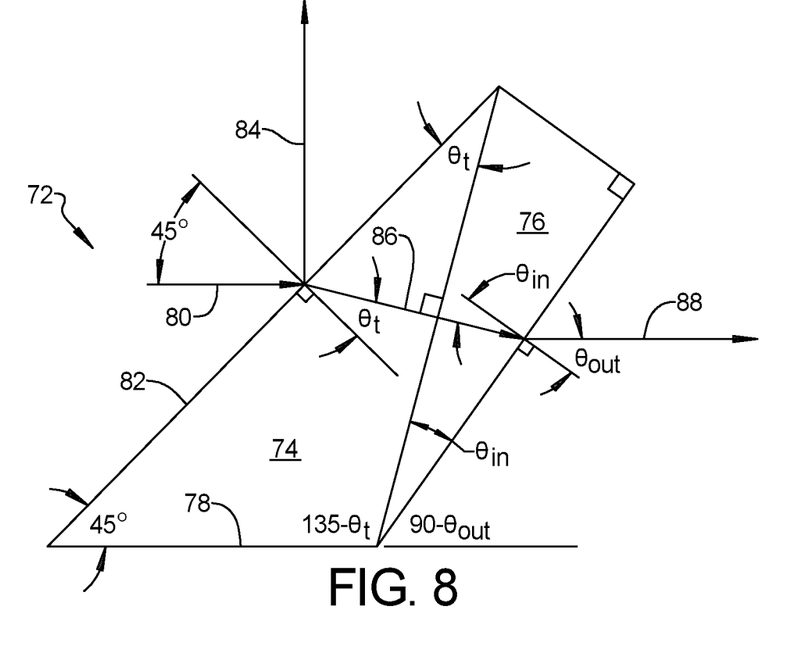
FIG. 8 is a side sectional view of a compound prism according to an exemplary embodiment of the present disclosure.

Referring to FIG. 2, FIG. 3, FIG. 4 and FIG. 5, in an exemplary embodiment, each of the plurality of lateral reflective surfaces 32A, 32B, 32C, 32D and each of the plurality of vertical reflective surfaces 34A, 34B, 34C, 34D is a compound prism 72. The prism 72 may be of any type suitable to provide reflectivity and transmittance characteristics as described herein. Referring to FIG. 8, in an exemplary embodiment each prism 72 includes a first piece 74 and a second piece 76. Each of the first and second pieces of the prism 72 have a refractive index, the refractive index of the second piece 76 being higher than a refractive index of the first piece 74.

As shown, the first piece 74 of the compound prism 72 is triangular in shape having a base 78 parallel to the direction of travel of an incoming image, as indicated by arrow 80, and an outer surface 82 oriented at degrees relative to the base 78. The second piece 76 of the compound prism 72 has a right triangle shape. Angles $\theta_r$, $\theta_{out}$ and $\theta_{in}$ are determined based on the refractive index of the first and second pieces 74, 76. Where $n_{air}$ is the refractive index of air, $n_1$ is the refractive index of the first piece 74 and $n_2$ is the refractive index of the second piece 76:

$n_{air}*\sin 45 \text{ degrees}=n_1*\sin \theta_r,$ $n_2*\sin \theta_{in}=n_{air}*\sin \theta_{out},$ and $\theta_{in}=\theta_{out}+\theta_r-45 \text{ degrees}.$ As the refractive index of the second piece 76, $n_2$, becomes larger, the angle $\theta_{in}$ becomes smaller, thus reducing the overall size of the prism, allowing for a thinner design.

When an image hits the compound prism 72 as indicated by arrow 80, a portion of the image incident upon the compound prism 72 is reflected from the outer surface 82 of the first piece 74, as shown by arrow 84, and a portion of the image incident upon the compound prism 72 passes through the first piece 74 and the second piece 76, as shown by arrow 86, and leaves the second piece 76 parallel to the path of the image incident upon the outer surface of the first piece 74 of the prism 72, as indicated by arrow 88. Wherein, the path of the image indicated by arrow 80 is parallel to the path of the image indicated by arrow 88.

Figure 6:
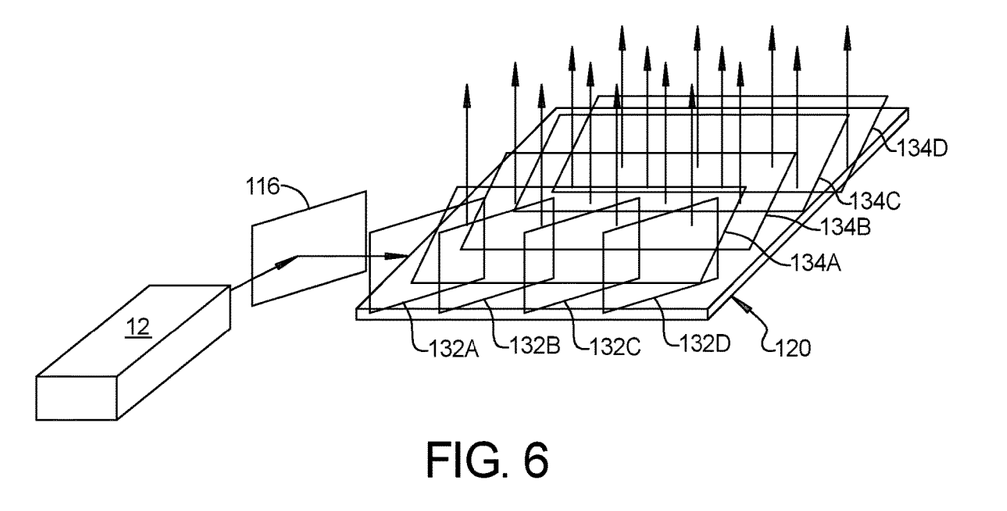
FIG. 6 is a perspective schematic view of an exit pupil replicator according to an exemplary embodiment, wherein each one of a plurality of lateral reflective surfaces and each one of a plurality of vertical reflective surfaces comprise a flat beam splitter.
Figure 7:
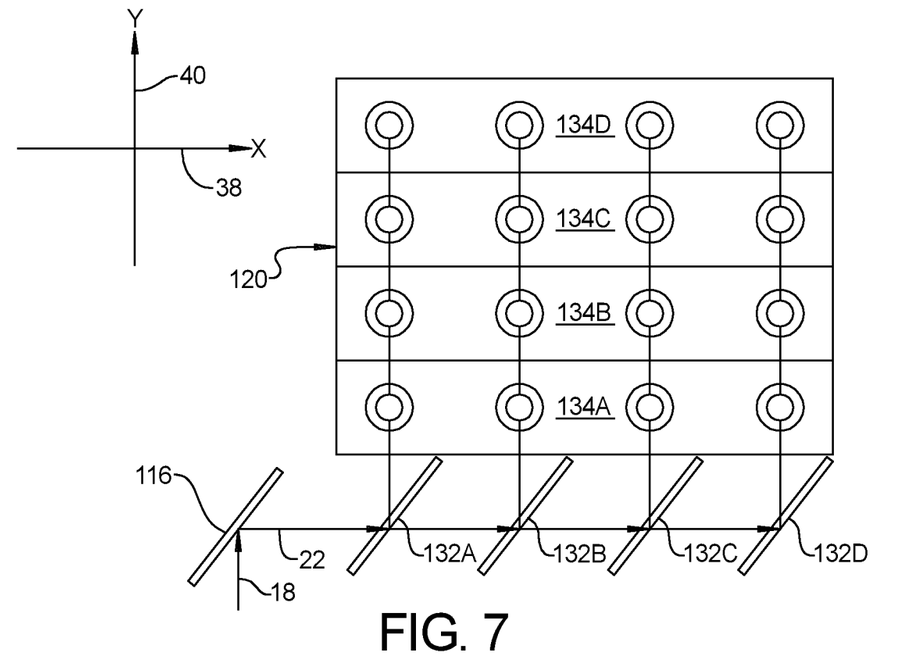
FIG. 7 is a top view of the exit pupil replicator shown in FIG. 6.

Referring to FIG. 6 and FIG. 7, in another exemplary embodiment, an exit pupil replicator 120 includes a plurality of lateral reflective surfaces 132A, 132B, 132C, 132D and a plurality of vertical reflective surfaces 134A, 134B, 134C, 134D, wherein each of the plurality of lateral reflective surfaces 132A, 132B, 132C, 132D and each of the plurality of vertical reflective surfaces 134A, 134B, 134C, 134D and the primary reflector 116 is a flat beam splitter, such as a pellicle beam splitter that is adapted to provide reflective and transmittance qualities similar to that of a compound prism. In various embodiments, it should be appreciated that an exit pupil replicator 20, 120 of the present disclosure may include combinations of lateral and vertical reflective surfaces 32A, 32B, 32C, 32D, 132A, 132B, 132C, 132D, 34A, 34B, 34C, 34D, 134A, 134B, 134C, 134D comprising a combination of both compound prisms 72 and beam splitters, depending on specific design parameters.

A head-up display system of the present disclosure offers a significant opportunity to reduce the overall weight and mass of the head-up system by utilizing an exit pupil replicator comprising a plurality of lateral reflective surfaces and a plurality of vertical reflective surfaces to propagate a two-dimensional array of identical images having equal intensity upward to an inner surface of the windshield, thereby creating a larger overall eye-box for the driver.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A head-up display system, comprising:
   a projector adapted to project an image;
   a primary reflector; and
   an exit pupil replicator, having a plurality of lateral reflective surfaces and a plurality of vertical reflective surfaces;
   the primary reflector adapted to reflect an image projected by the projector to the exit pupil replicator;
   each of the plurality of lateral reflective surfaces adapted to reflect a portion of the image reflected from the primary reflector to the plurality of vertical reflective surfaces and to transmit a portion of the image reflected from the primary reflector to an adjacent one of the plurality of lateral reflective surfaces, a last one of the plurality of lateral reflective surfaces adapted to reflect 100% of the image reflected from the primary reflector to the plurality of vertical reflective surfaces, wherein the plurality of lateral reflective surfaces is adapted to split the projected image reflected from the primary reflector into a one-dimensional array of identical projected images having equal intensity and to reflect the one-dimensional array of identical projected images having equal intensity to the plurality of vertical reflective surfaces; and the plurality of vertical reflective surfaces adapted to split the one-dimensional array of identical projected images having equal intensity reflected from the plurality of lateral reflective surfaces into a two-dimensional array of identical projected images having equal intensity and to reflect the two-dimensional array of identical projected images having equal intensity upward to a windshield.

2. The head-up display system of claim 1, wherein the projected image is projected from the projector to the primary reflector, reflected from the primary reflector to the plurality of lateral reflective surfaces of the exit pupil replicator, and reflected from the plurality of lateral reflective surfaces of the exit pupil replicator to the plurality of vertical reflective surfaces of the exit pupil replicator within a single plane.

3. The head-up display system of claim 1, wherein the projected image is projected from the projector to the primary reflector and reflected from the primary reflector to the plurality of lateral reflective surfaces of the exit pupil replicator within a first plane, and the projected image is reflected from the plurality of lateral reflective surfaces of the exit pupil replicator to the plurality of vertical reflective surfaces of the exit pupil replicator in a second plane.

4. The head-up display system of claim 1, wherein each of the plurality of lateral reflective surfaces and each of the plurality of vertical reflective surfaces is a compound prism.

5. The head-up display system of claim 4, wherein each prism includes a first piece and a second piece, a refractive index of the second piece being higher than a refractive index of the first piece, wherein a portion of an image incident upon the prism is reflected from an outer surface of the first piece, and a portion of the image incident upon the prism passes through the first piece and the second piece and leaves the second piece parallel to a path of the image incident upon the prism.

6. The head-up display system of claim 1, wherein each of the plurality of lateral reflective surfaces and each of the plurality of vertical reflective surfaces is a flat beam splitter.

7. The head-up display system of claim 1, wherein each of the plurality of lateral reflective surfaces and each of the plurality of vertical reflective surfaces is a prism.

8. The head-up display system of claim 1, wherein the plurality of lateral reflective surfaces are positioned in series and have varying reflectivity.

9. The head-up system of claim 1, wherein the plurality of vertical reflective surfaces are positioned in series and have varying reflectivity, each of the plurality of vertical reflective surfaces adapted to reflect a portion of an image reflected from each of the plurality of lateral reflective surfaces upward to the windshield and to transmit a portion of the image reflected from each of the plurality of lateral reflective surfaces to an adjacent one of the plurality of vertical reflective surfaces, a last one of the plurality of vertical reflective surfaces adapted to reflect 100% of the image reflected from each of the plurality of lateral reflective surfaces upward to the windshield.

10. A head-up display system, comprising:
a projector adapted to project an image;
a primary reflector; and
an exit pupil replicator, the primary reflector adapted to reflect an image projected by the projector to the exit pupil replicator, the exit pupil replicator including a plurality of lateral reflective surfaces and a plurality of vertical reflective surfaces;
the plurality of lateral reflective surfaces positioned in series and having varying reflectivity, each of the plurality of lateral reflective surfaces adapted to reflect a portion of an image reflected from the primary reflector to the plurality of vertical reflective surfaces and to transmit a portion of the image reflected from the primary reflector to an adjacent one of the plurality of lateral reflective surfaces, a last one of the plurality of lateral reflective surfaces adapted to reflect 100% of the image reflected from the primary reflector to the plurality of vertical reflective surfaces, wherein the plurality of lateral reflective surfaces split the projected image reflected from the primary reflector into a one-dimensional array of identical projected images having equal intensity and reflects the one-dimensional array of identical projected images having equal intensity to the plurality of vertical reflective surfaces;
the plurality of vertical reflective surfaces positioned in series and having varying reflectivity, each of the plurality of vertical reflective surfaces adapted to reflect a portion of an image reflected from each of the plurality of lateral reflective surfaces upward to the windshield and to transmit a portion of the image reflected from each of the plurality of lateral reflective surfaces to an adjacent one of the plurality of vertical reflective surfaces, a last one of the plurality of vertical reflective surfaces adapted to reflect 100% of the image reflected from each of the plurality of lateral reflective surfaces upward to the windshield, wherein the plurality of vertical reflective surfaces split the one-dimensional array of identical projected images having equal intensity reflected from the plurality of lateral reflective surfaces into a two-dimensional array of identical projected images having equal intensity and reflect the two-dimensional array of identical projected images having equal intensity upward to a windshield.

11. The head-up display system of claim 10, wherein the projected image is projected from the projector to the primary reflector, reflected from the primary reflector to the plurality of lateral reflective surfaces of the exit pupil replicator, and reflected from the plurality of lateral reflective surfaces of the exit pupil replicator to the plurality of vertical reflective surfaces of the exit pupil replicator within a single plane.

12. The head-up display system of claim 10, wherein the projected image is projected from the projector to the primary reflector and reflected from the primary reflector to the plurality of lateral reflective surfaces of the exit pupil replicator within a first plane, and the projected image is reflected from the plurality of lateral reflective surfaces of the exit pupil replicator to the plurality of vertical reflective surfaces of the exit pupil replicator in a second plane.

13. The head-up display system of claim 10, wherein each of the plurality of lateral reflective surfaces and each of the plurality of vertical reflective surfaces is a compound prism.

14. The head-up display system of claim 13, wherein each prism includes a first piece and a second piece, a refractive index of the second piece being higher than a refractive index of the first piece, wherein a portion of an image incident upon the prism is reflected from an outer surface of the first piece, and a portion of the image incident upon the prism passes through the first piece and the second piece and leaves the second piece parallel to a path of the image incident upon the prism.

15. The head-up display system of claim 10, wherein each of the plurality of lateral reflective surfaces and each of the plurality of vertical reflective surfaces is a flat beam splitter.

16. The head-up display system of claim 10, wherein each of the plurality of lateral reflective surfaces and each of the plurality of vertical reflective surfaces is one of a prism and a flat beam splitter.

17. A head-up display system, comprising:
a projector adapted to project an image;
a primary reflector; and
an exit pupil replicator, the primary reflector adapted to reflect an image projected by the projector to the exit pupil replicator, the exit pupil replicator including a plurality of lateral reflective surfaces and a plurality of vertical reflective surfaces, each of the plurality of lateral reflective surfaces and each of the plurality of vertical reflective surfaces being one of a compound prism and a flat beam splitter;
the plurality of lateral reflective surfaces positioned in series and having varying reflectivity, each of the plurality of lateral reflective surfaces adapted to reflect a portion of an image reflected from the primary reflector to the plurality of vertical reflective surfaces and to transmit a portion of the image reflected from the primary reflector to an adjacent one of the plurality of lateral reflective surfaces, a last one of the plurality of lateral reflective surfaces adapted to reflect 100% of the image reflected from the primary reflector to the plurality of vertical reflective surfaces, wherein the plurality of lateral reflective surfaces split the projected image reflected from the primary reflector into a one-dimensional array of identical projected images having equal intensity and reflects the one-dimensional array of identical projected images having equal intensity to the plurality of vertical reflective surfaces;
the plurality of vertical reflective surfaces positioned in series and having varying reflectivity, each of the plurality of vertical reflective surfaces adapted to reflect a portion of an image reflected from each of the plurality of lateral reflective surfaces upward to the windshield and to transmit a portion of the image reflected from each of the plurality of lateral reflective surfaces to an adjacent one of the plurality of vertical reflective surfaces, a last one of the plurality of vertical reflective surfaces adapted to reflect 100% of the image reflected from each of the plurality of lateral reflective surfaces upward to the windshield, wherein the plurality of vertical reflective surfaces split the one-dimensional array of identical projected images having equal intensity reflected from the plurality of lateral reflective surfaces into a two-dimensional array of identical projected images having equal intensity and reflect the two-dimensional array of identical projected images having equal intensity upward to a windshield.

18. The head-up display system of claim 17, wherein the projected image is projected from the projector to the primary reflector, reflected from the primary reflector to the plurality of lateral reflective surfaces of the exit pupil replicator, and reflected from the plurality of lateral reflective surfaces of the exit pupil replicator to the vertical surfaces of the exit pupil replicator within a single plane.

19. The head-up display system of claim 17, wherein the projected image is projected from the projector to the primary reflector, reflected from the primary reflector to the plurality of lateral reflective surfaces of the exit pupil replicator, and reflected from the plurality of lateral reflective surfaces of the exit pupil replicator to the vertical surfaces of the exit pupil replicator within two independent planes.

20. The head-up display system of claim 1, wherein each of the plurality of lateral reflective surfaces and each of the plurality of vertical reflective surfaces is a flat beam splitter.

* * * * *